Aug. 16, 1927.
J. J. BROPHY ET AL
1,638,913
MACHINE FOR MEASURING SHEET MATERIAL
Filed Aug. 29, 1925
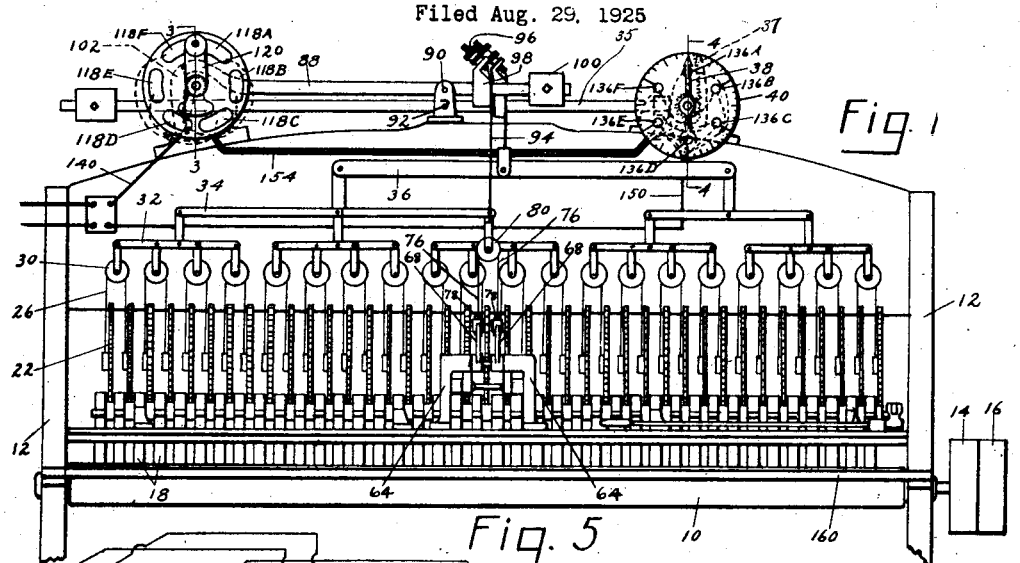
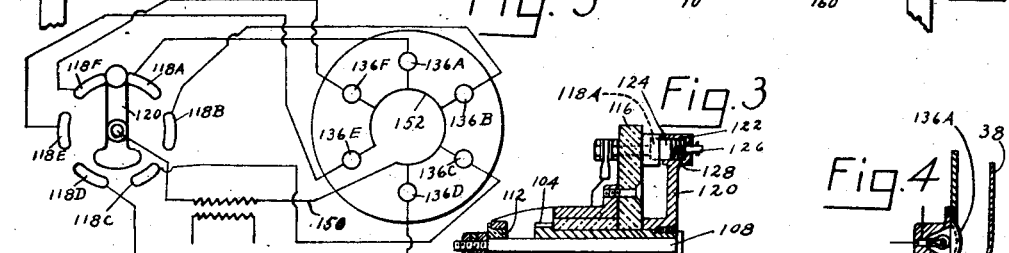
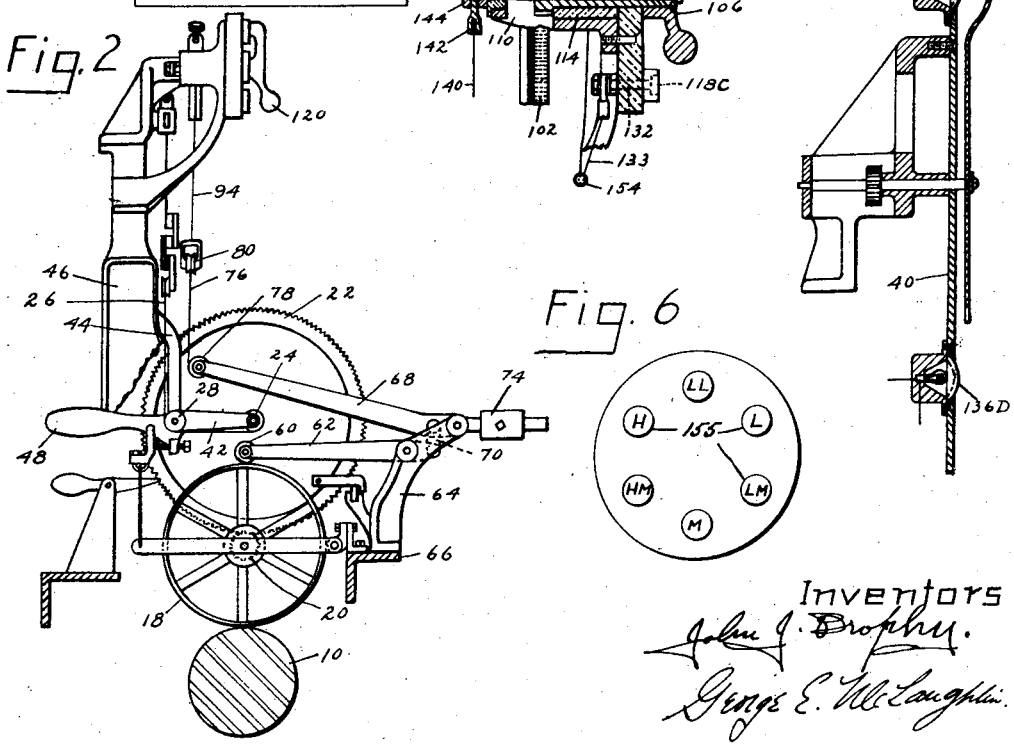
Inventors
John J. Brophy.
George E. McLaughlin.

Patented Aug. 16, 1927.

1,638,913

UNITED STATES PATENT OFFICE.

JOHN J. BROPHY, OF SALEM, AND GEORGE E. McLAUGHLIN, OF BROOKLINE, MASSACHUSETTS, ASSIGNORS TO THE TURNER TANNING MACHINERY COMPANY, OF PORTLAND, MAINE, A CORPORATION OF MAINE.

MACHINE FOR MEASURING SHEET MATERIAL.

Application filed August 29, 1925. Serial No. 53,368.

This invention relates to machines for measuring sheet material and is illustrated as embodied in a machine designed to measure at one operation both the surface area of a piece of sheet material such as a skin or hide and the thickness of the material.

It has been heretofore proposed to measure a hide or skin both as to its surface area and its thickness and to indicate the results on dials or other recording mechanism, the surface area being recorded, for example, in feet or fractions thereof and the thickness dimensions of pieces of material in fractions of an inch. A disadvantage of this arrangement resides in the fact that confusion is very apt to arise in the mind of the operator in announcing the measurements or in that of his assistant. It is to be understood that in operating with machines for measuring hides or skins the operator introduces a hide or skin into the machine and that it is received by his assistant on the other side of the machine. After the measuring operation on a given piece of material is concluded the operator calls out the measurements to his assistant whose duty it is to inscribe the proper numbers upon the piece of material just measured. It not infrequently happens that errors are made through the interchanging of numbers indicating the two measurements, other causes also contributing to errors in recording, for instance, noise and the similarity in sound of certain of the numbers as, for example, two and three, seven and eleven. In passing it may be mentioned as an instance of the lengths to which resort has been had in an attempt to avoid certain sources of error, that it has become a matter of custom in leather measuring rooms to substitute for the word "eleven" the word "buck", "buck one" meaning eleven and one-quarter feet. It will be readily understood that the attempt to communicate orally the thickness dimension of the piece of work along with the surface area tends to multiply the sources of error. On the other hand, if the operator should attempt to translate the scale of thickness dimensions into terms such as "light", "medium", and "heavy" it would impose an extra burden on his attention and be very likely to slow up operations to a considerable extent.

In view of the foregoing, it is an object of the invention to provide an improved machine for measuring simultaneously the surface area of a hide or skin, or similar piece of work, and the thickness dimension thereof, the use of which will be less likely to lead to errors than that of the construction and arrangement heretofore proposed for this purpose.

To this end, and in accordance with important features of the invention, improved means is provided for measuring the thickness dimension of a piece of material, which is undergoing measurement of its surface area, which may utilize one or more of the surface measuring elements of several of the well known types of surface measuring machines to operate electrical contacts which serve to control a novel indicator means. In the illustrated machine a member which is moved by the work away from the work support distances corresponding to the thickness dimensions of a piece of work is connected so as to control selective lighting of a plurality of electric lamps, the arrangement being such that the passage of a given piece of work will result in the lighting of one or more lamps which indicate work thickness dimensions. It is sufficient for practical purposes to provide for grading hides or skins or other pieces of leather according to thickness into a moderate number of grades, provision being made in the illustrated machine for grading the work into six grades differing from each other in predetermined amounts. It will be understood however, that any desired number of lamps may readily be provided to indicate many thicknesses in a wide range of thickness dimensions. Since each piece of leather varies considerably in thickness in different portions thereof, more than one lamp will ordinarily be lighted during the passage of the leather, and the operator will be guided in his decision as to grade by the lamp which is lit the greater part of the time.

Conveniently, the lamps are used to light up letters or other characters or symbols chosen more or less arbitrarily to represent certain thicknesses in the usual or known range of thicknesses of the work pieces to be measured. It will be understood, however, that the invention is not limited to its illustrated embodiment but that various details of construction may be modified without departing from the principles of the invention.

Preferably, and as shown, mechanical connections are provided between a work contacting member and a switch member which is thus controlled to close different circuits in accordance with predetermined variations in the thickness dimensions of the pieces of work, movement of the switch being variable in extent and causing, in accordance with its extent of movement, lighting of the lamps which represent the minimum and the maximum thicknesses of the work undergoing measurement. Preferably the lamps are mounted in connection with the same dial face over which the pointer of the surface measuring mechanism is moved so that the operator may read both measurements from the same recording mechanism.

It is to be understood that the thickness measuring and recording means is not limited in its application to an area measuring machine but that it may be employed as a separate machine or in conjunction with other machines for operating on sheet material.

Other features of the invention and novel combinations of parts will be described in the detailed specification and pointed out in the appended claims.

In the drawings,

Fig. 1 is a view in front elevation of a measuring machine showing one embodiment of the invention;

Fig. 2 is a vertical transverse section of the machine shown in Fig. 1;

Fig. 3 is a section along the line 3, 3 of Fig. 1;

Fig. 4 is a section along the line 4, 4 of Fig. 1;

Fig. 5 is a diagrammatic representation of the circuit connections between the contact plates and the lamps; and Fig. 6 is a face view, enlarged, of the indicator plate showing the identifying characters in front of the electric lamps.

In the machine shown in the drawings there is provided a rotatable bed roll 10 supported in the upright sides 12 of the machine frame, the bed roll being provided with the usual driving pulleys 14, 16, it being understood, however, that any other well known arrangement may be used for furnishing power to drive the bed roll such, for instance, as an electric motor mounted directly on the shaft of the bed roll. Cooperating with the bed roll 10 is a series of measuring wheels 18, each one of which is provided with a pinion 20 (Fig. 2) adapted to mesh with toothed devices or wheels 22, the meshing taking place when the measuring wheel 18 is lifted from the bed roll 10 by the work. Preferably, and as shown, each toothed wheel 22 is provided with a grooved hub or pulley 24 over which passes a flexible member 26 which may be a flexible steel ribbon or a chain or cable adapted to be wound upon the hub 24 upon rotation of the toothed wheel 22. After passing around an idler pulley 28 stationary in space, the flexible member 26 passes over or is otherwise connected to an idler pulley 30 (Fig. 1) supported by a lever 32 connected in turn to other levers 34 and 36. From the last named lever 36 connections are made, through pivoted member 35 and segmental rack member 37, to rotate a pointer 38, the latter during its rotation moving over a scale on an indicator plate 40 whereby the surface area of the piece of material is recorded on the indicator plate 40. As shown more particularly in Fig. 2 of the drawings each toothed wheel 22 is mounted upon one end of a lever 42 pivoted intermediate between its ends to an arm 44 rigidly secured from cross piece 46 of the machine frame, said lever having an enlarged portion 48 forming a counter balance for the toothed wheel 22. Since the levers 42 are usually made of cast metal and the arm 48 thus varies in weight in different levers, provision is made whereby the levers 42 may be adjusted from the rear of the machine so that the levers with their toothed wheels may be balanced and in this condition brought in close proximity to the driving pinions 20. For a more complete description of the illustrated surface measuring mechanism reference should be had to United States Letters Patent No. 931,144 granted August 17, 1909, on application of L. O. Ramsdell.

In the illustrated machine, the thickness measuring mechanism conveniently utilizes one or more of the measuring wheels 18 of the surface measuring mechanism. In the present embodiment of the invention two of the measuring wheels 18 are employed to operate the thickness measuring mechanism, the two wheels 18 selected being located one on each side of the transverse center of the measuring machine so that these two wheels will be spaced such a distance from each other as to engage with the skin or hide along parallel lines extending lengthwise of the skin, the latter being introduced shoulder or head end first so that these parallel lines extend substantially parallel with the back bone line of the skin or hide undergoing measurement. Resting upon one of the two measuring wheels 18 in the construction shown is an idler roll 60 (Fig. 2) at one end of a lever 62 pivoted intermediate between its ends to a bracket 64 secured to a cross piece 66 at the front side of the machine. Pivoted at a point intermediate between its ends to the same bracket 64 is a second lever 68 connected to the first lever by a link 70. It will be clear upon inspection of Fig. 2 of the drawings that movement of the measuring wheel 18 away from the bed roll 10 will operate the lever 62, moving its longer arm in an upward direction, whereby the longer arm of the lever 68 is pulled downwardly through the link connection 70. When the measuring wheel 18 moves downwardly because of a lessened thickness of the work or the absence of work between it and the bed roll 10, the longer arm of the lever 62 moves downwardly and the long arm of the lever 68 moves upwardly under the influence of the weight 74 at the free end of the lever 68. Secured to the other end of the lever 68 is a flexible member 76 shown as a flexible steel ribbon fixedly secured to the under surface of the end of the lever 68 back of an idler roll 78 at the end of the lever. It will be understood that similar connections are employed between the other measuring wheel 18 and the flexible steel ribbon 76. While a considerable number of thickness measuring members such as the wheels 18 might be employed to measure the thickness dimension of the work along a large number of imaginary lines on the work, it has been found sufficient, for practical purposes, to employ but two thickness measuring members. Hence, the flexible member 76 is passed over an idler roller 80 (Figs. 1 and 2) from one lever 68 to the similar lever 68 connected to the other of the two measuring wheels 18. Downward movement of one or both of the long arms of the levers 68 is transmitted to a lever 88 (Fig. 1) pivoted at 90 on a bracket 92 extending upwardly from the machine frame, a connection between the idler roll 80 and the lever 88 being formed in the illustrated construction by a flexible cable 94 adjustably as to length by means of a set screw 96 carried by a block 98 secured to the lever 88. For counter-balancing the lever 88 and holding it in initial position, or position of rest while the machine is not being used, there is provided weighted member 100 adjustable along the lever 88. At one end the lever 88 carries a segmental rack member 102 struck on the arc of a circle whose center is the pivot for the lever 88, the rack member being in mesh with a pinion 104 (Fig. 3) secured to or integral with a hollow shaft 106 rotatable on a shaft 108, the two shafts 106, 108 being mounted in a bracket or arm extension 110 on the upper cross bar of the machine frame. At one end the shaft 108 is mounted in a bearing in the bracket 110 provided with an insulation ring 112 while at its other end the shaft 108 is enclosed by the hollow shaft 106 which is rotatably mounted within an insulated bearing 114. Secured to the bracket 110 is a plate of insulation material 116 which carries secured thereto a plurality of contact plates 118$^A$, 118$^B$, 118$^C$, etc., each serving on occasion as a conductor of electricity. Mounted fixedly but adjustably upon the end of the hollow shaft 106 is a switch member 120 adapted to contact one at a time with the series of contact plates. In order that the contact between the switch member 120 and the contact plates may be effective in spite of wear or loose connections the end of the switch member 120 is provided with a socket 122 which carries a plate 124 held within the socket 122 by a pin and bolt connection 126 and pressed yieldingly toward a contact plate by means of a spring 128 within the socket 122. Each contact plate is connected, through its bolt 132, by means of a wire 133 (Fig. 3) to an electric lamp in a series of lamps, as indicated diagrammatically in Fig. 5 of the drawings. Referring to the diagram in Fig. 5 it will be observed that when the switch member 120 is in contact with the contact plate 118$^A$ the circuit of the lamp 136$^A$ will be closed, thus lighting the lamp. Similarly, when the switch member 120 is moved so that its contacting plate 124 is in contact with the contact plate 118$^B$ that the lamp 136$^B$ will be lighted and that the other lamps 136$^C$, 136$^D$, 136$^E$ and 136$^F$ will be selectively lighted upon engagement of the switch 120 with the corresponding contact plates 118$^C$, 118$^D$, 118$^E$ and 118$^F$. One terminal of the primary circuit comprises a wire 140 which is connected to the shaft 108 by a clip 142 and binding nuts 144 in contact with the insulation bearing 112, it being understood that the shaft 108 is a conductor in the line from the switch member 120. The other terminal is indicated at 150 (Fig. 1 of the drawings) and is connected to the wire 152 (Fig. 5). In Fig. 1 there is disclosed a cable 154 which carries all of the six wires connecting the contact plates with the lamps. Preferably, and as shown, in Figs. 1 and 4, the lamps are mounted upon the dial or indicator plate 40 in such a way as to light selectively glass disks or plates 155 (Fig. 6) carrying letters or other characters chosen more or less arbitrarily to represent certain thicknesses in the usual or known range of thicknesses of the work pieces to be measured. For practical purposes it is sufficient to grade the pieces of leather into a relatively small number of grades such, for instance, as extra light (LL), light (L), light medium (LM), medium (M), heavy medium (HM), and heavy (H). While different colored globes might be used to indicate different thicknesses, it is considered to be less of a burden on the operator's attention to have lamps to light up letters or other characters or symbols representing the thicknesses. By having the lamps mounted on the same dial or indicator plate as that used in connection with the pointer of the area measuring machine the work of the operator is simplified since he may obtain both of the desired measurements, that is, for area and for thickness from the same dial or indicator mechanism.

In operating with the machine shown in the drawings a skin or hide will be introduced over the work supporting table 160 and into contact with the bed roll 10 and the measuring rolls 18 so that the work may be seized by the measuring wheels and the bed roll and fed through the machine. In all cases the skin or hide will be introduced with the head or shoulder portion in advance and with the line of the backbone parallel to the direction of feed and crossing the bed roll substantially at the transverse center of the measuring machine so that the two measuring wheels 18 which are also thickness measuring wheels will trace each a path substantially equidistant from the line of the backbone. During the time that the skin or hide is passing through the machine the switch member 120, which is operated by connections from the measuring wheels 18, will be vibrated as the thickness varies within the usually relatively narrow limits, it being possible, however, that the variation between the thinnest part and the thickest part will be such that two lamps will be alternately lit during the vibratory movement of the switch. In some cases only one lamp will be lit since there is a slight space between each contact plate and its neighbor on either side. In the majority of cases the member 120 will vibrate between two lamps and the operator must be guided by the lamp that remains lighted the greater part of the time. The great advantage of this arrangement lies in the fact that for given ranges of thicknesses the operator will ordinarily have no hesitation in deciding upon the thickness to be announced to his assistant. After the skin has passed a considerable distance into the measuring machine so that the flank portions of the skin have been properly entered the operator may glance at the indicator plate to get the thickness measurement, which is the more readily retained in mind, since he does not have to notice the area until the whole skin has passed through, the record of the area measurement remaining in place until the machine is tripped to restore the area recording mechanism to its initial position.

Having thus described our invention, what we claim as new and desire to secure by Letters Patent of the United States is:—

1. In a machine for measuring pieces of leather, a work support, a member adapted to be moved by work on the support, a plurality of lamps each arranged to illuminate a character or symbol for indicating a certain thickness dimension in a given range of thicknesses, and electrical means arranged to be controlled by said member whereby the lamps are lighted selectively upon movement of said member to indicate thickness dimensions of the work.

2. In a machine for measuring pieces of leather, a work support, a member arranged to be moved by the work on the support, and electrical means for indicating thickness dimensions of a piece of leather throughout a wide range of thicknesses and arranged to be controlled by the member as the latter is moved whereby the operator may be informed of the thickness dimensions of the work.

3. In a machine for measuring pieces of leather, an indicator plate having located closely adjacent thereto a plurality of lamps having each a character associated therewith for indicating a certain thickness dimension in a given range of thicknesses, a work support, a member adapted to be operated by the work passing over the work support, and electrical connections arranged to be controlled by the member to cause selective lighting of the lamps in accordance with the thickness dimensions of the work passing beneath said member.

4. In a machine of the character described, a work support, means adapted to contact with the work passing over the work support and to be operated thereby, an indicator plate having associated therewith a plurality of lamps, a pointer, connections controlled by the work contacting means for causing the pointer to move over the indicator plate to record the surface area of the work, and other connections for causing the lamps to light in accordance with thickness dimensions of the work being measured.

5. In a machine for measuring and indicating thickness dimensions of pieces of leather throughout a wide range of thicknesses, a work support, a member adapted to be operated by the work on the support, a plurality of lamps arranged in a definite order, and electrical means arranged to be controlled by said member for selectively lighting the lamps to indicate thickness dimensions of the work in accordance with a predetermined range of variations.

6. In a machine for measuring thickness dimensions of pieces of leather, a work support, a member mounted above the work support to be moved by the work on the support, and electrical means for indicating thickness dimensions of a piece of leather throughout a wide range of thicknesses and arranged to be controlled by the member as the latter is moved by the work whereby the operator may be informed of the thickness dimensions of the work in three or more places all of different thickness dimensions.

7. In a machine for measuring and indicating thickness dimensions of pieces of leather throughout a wide range of thicknesses, an indicator plate having associated therewith a plurality of lamps, a work support, a member adapted to be lifted and moved up and down as work varying substantially in thickness passes over the work support, and electrical connections arranged to be controlled by the member to cause selective lighting of one or more lamps to indicate thickness dimensions of the work in accordance with a predetermined range of variations.

8. In a machine of the character described, a work support, wheels adapted to contact with the work passing over the work support and to be lifted and rotated thereby, an indicator plate having associated therewith a plurality of lamps, a pointer, connections controlled by the wheels for causing the pointer to move over the indicator plate to record the surface area of the work, and other connections controlled by certain of the wheels for causing lighting of the lamps in accordance with thickness dimensions of the work being measured.

9. In a machine for measuring thickness dimensions of pieces of leather, a work support, a work contacting member adapted to be moved by the work, a plurality of contact plates, a switch member movable to contact with all of the plates one at a time, a plurality of lamps arranged in accordance with a predetermined range of variations in the thickness dimensions of pieces of leather, each lamp being connected with one of the contact plates in a normally open circuit, and connections between the work contacting member and the switch member for moving the latter to close the circuit of one of the contact plates and its relative lamp whereby the latter is lighted, thus indicating a thickness dimension of the piece of work.

10. In a machine for measuring thickness dimensions of pieces of leather, a work support, a member for contacting with the work to be moved thereby, an indicator plate provided with a plurality of lamps, a member carrying a plurality of contact plates, each plate being connected in a normally open circuit with one of the lamps, a switch member movable to contact with the plates one at a time, and connections between the work contacting member and the switch for moving the latter in accordance with the extent of movement of the work contacting member whereby the switch closes the circuit of a contact plate and its related lamp, thereby indicating to the operator a thickness dimension of the piece of work.

11. In a machine of the character described, a work support, a contact member arranged to be operated by the work as the latter is passed over the work support, an indicator plate provided with a plurality of lamps and a numbered scale, a pointer movable over the scale, and connections controlled by the work contacting member for causing the pointer to move over the scale on the indicator plate and for lighting certain of the lamps whereby both the surface area and the thickness dimensions of the work along the path of the contact member are simultaneously indicated on the indicator plate.

12. In a machine of the character described, a roll for supporting and feeding the work, a wheel above the roll for contact with the work to be lifted and rotated by the work during its passage over the feed roll, means controlled by the wheel for recording the surface area of the piece of work a plurality of lamps, and means controlled by the wheel for lighting the lamps in accordance with the height that the wheel is lifted by the work.

13. In a machine of the character described, a work support, a contact member arranged to be operated by the work, an indicator plate having associated therewith a plurality of lamps and a numbered scale, a pointer movable over the scale, and connections controlled by the work contacting member for causing the pointer to move over the scale on the indicator plate and for lighting certain of the lamps whereby both the surface area and thickness dimensions of the work are indicated on the indicator plate.

14. In a machine of the character described, a work support, a contact member operated by the work during its passage over the work support, means controlled by the contact member for recording the surface area of the piece of work, a plurality of lamps, and means controlled by the contact member for lighting the lamps in accordance with thickness dimensions of the work.

15. In a machine of the character described, a work support, a contact member operated by the work as the latter is passed over the support, a mechanism for recording the surface area of a piece of work, electrical means for indicating thickness dimensions of the work, and connections between the work contacting member and said means and said mechanism for controlling them both, whereby the area and thickness dimensions of the piece of work are indicated by the machine.

In testimony whereof we have signed our names to this specification.

JOHN J. BROPHY.
GEORGE E. McLAUGHLIN.